United States Patent
Nakajima

(10) Patent No.: US 6,858,956 B2
(45) Date of Patent: Feb. 22, 2005

(54) MAGNETIC POLE POSITION DETECTOR FOR ROTOR

(75) Inventor: Yuki Nakajima, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/778,759

(22) Filed: Feb. 8, 2001

(65) Prior Publication Data

US 2001/0015582 A1 Aug. 23, 2001

(30) Foreign Application Priority Data

Feb. 10, 2000 (JP) .................................. 2000-033500
Jan. 19, 2001 (JP) .................................. 2001-011876

(51) Int. Cl.[7] .................... H02K 11/00; H02K 21/12; H02K 1/00; H02K 19/26; H02K 21/00
(52) U.S. Cl. .................... 310/68 B; 310/310; 310/192; 310/156.05; 310/156.06; 310/156.53; 310/156.36
(58) Field of Search .................... 310/68 B, 156.04, 310/156.05, 156.06, 156.07, 156.08, 156.15, 156.53–156.56, 156.32–156.37, 156.49, 156.61, 156.79, 156.82, 192; 180/65.1–65.8

(56) References Cited

U.S. PATENT DOCUMENTS

| | | | |
|---|---|---|---|
| 4,364,005 A | * 12/1982 | Kohzai et al. | 322/31 |
| 4,959,577 A | * 9/1990 | Radomski | 310/263 |
| 5,369,325 A | * 11/1994 | Nagate et al. | 310/156 |
| 5,408,153 A | * 4/1995 | Imai et al. | 310/68 B |
| 5,436,519 A | * 7/1995 | Takahashi et al. | 310/217 |
| 5,440,185 A | * 8/1995 | Allwine | 310/156 |
| 5,452,663 A | * 9/1995 | Berdut | 104/283 |
| 5,475,277 A | * 12/1995 | Johnson | 310/156 |
| 5,477,741 A | * 12/1995 | Takenaka et al. | 74/116 |
| 5,574,322 A | * 11/1996 | Nii et al. | 310/90.5 |
| 5,679,995 A | * 10/1997 | Nagate et al. | 310/156.54 |
| 5,682,073 A | * 10/1997 | Mizuno | 310/165 |
| 5,689,147 A | * 11/1997 | Kaneda et al. | 310/216 |
| 5,717,316 A | * 2/1998 | Kawai | 322/46 |
| 5,744,894 A | 4/1998 | Cho et al. | |
| 5,773,908 A | * 6/1998 | Stephens et al. | 310/254 |
| 5,808,392 A | * 9/1998 | Sakai et al. | 310/214 |
| 5,821,710 A | * 10/1998 | Masuzawa et al. | 318/254 |
| 5,857,762 A | * 1/1999 | Schwaller | 362/72 |

(List continued on next page.)

FOREIGN PATENT DOCUMENTS

| | | |
|---|---|---|
| DE | 195 27 981 A1 | 2/1997 |
| EP | 0 549 426 A1 | 6/1993 |
| JP | 11-215881 | 8/1999 |
| JP | 02001298932 A | * 10/2001 |

Primary Examiner—Tran Nguyen
Assistant Examiner—Julio Da Silva Gonzalez
(74) Attorney, Agent, or Firm—Foley & Lardner LLP

(57) ABSTRACT

A rotor (17, 31, 71, 91, 101, 121, 131, 141, 201, 401) of a motor (13, 51) is provided with a rotation shaft (21, 59, 410) and a plurality of magnets (15, 53, 75, 105, 210A, 210B, 411) on a circular periphery. Plates (25, 25A, 25B, 25C, 63, 77, 220, 300, 430) made of magnetic materials are provided so that each of which is magnetized by leakage flux of a corresponding magnet (15, 53, 75, 105, 210A, 210B, 401). The plates (25, 25A, 25B, 25C, 33, 63, 77, 107, 220, 300, 430) are disposed along a circular path such that a maximum flux density is formed at both peripheral ends. A magnetic sensor (27) outputs a signal in response to the variation of a flux density on the circular path.

30 Claims, 12 Drawing Sheets

U.S. PATENT DOCUMENTS

| | | | | | |
|---|---|---|---|---|---|
| 5,861,693 A | * | 1/1999 | Takahashi | ................... | 310/113 |
| 5,864,191 A | * | 1/1999 | Nagate et al. | .............. | 310/156 |
| 5,864,192 A | * | 1/1999 | Nagate et al. | ......... | 310/156.05 |
| 5,874,796 A | * | 2/1999 | Petersen | ..................... | 310/156 |
| 5,962,944 A | * | 10/1999 | Narita et al. | ................ | 310/156 |
| 5,982,074 A | * | 11/1999 | Smith et al. | ........... | 310/156.36 |
| 5,990,592 A | * | 11/1999 | Miura et al. | ................ | 310/156 |
| 6,034,460 A | * | 3/2000 | Tajima et al. | ................ | 310/179 |
| 6,097,129 A | * | 8/2000 | Furtwangler | ................ | 310/256 |
| 6,133,655 A | * | 10/2000 | Suzuki et al. | ................. | 310/51 |
| 6,181,036 B1 | * | 1/2001 | Kazama et al. | ........... | 310/68 B |
| 6,194,800 B1 | * | 2/2001 | Maruyama et al. | ........ | 310/90.5 |
| 6,392,324 B1 | * | 5/2002 | Kuwahara | .............. | 310/156.11 |
| 2001/0013731 A1 | * | 8/2001 | Shinohara et al. | ............ | 310/85 |

* cited by examiner

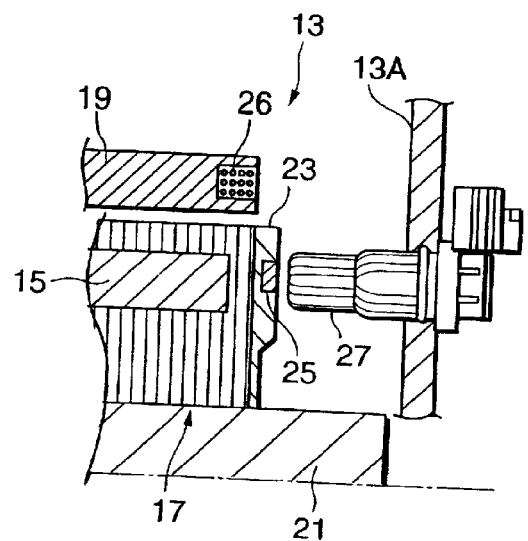
FIG. 1
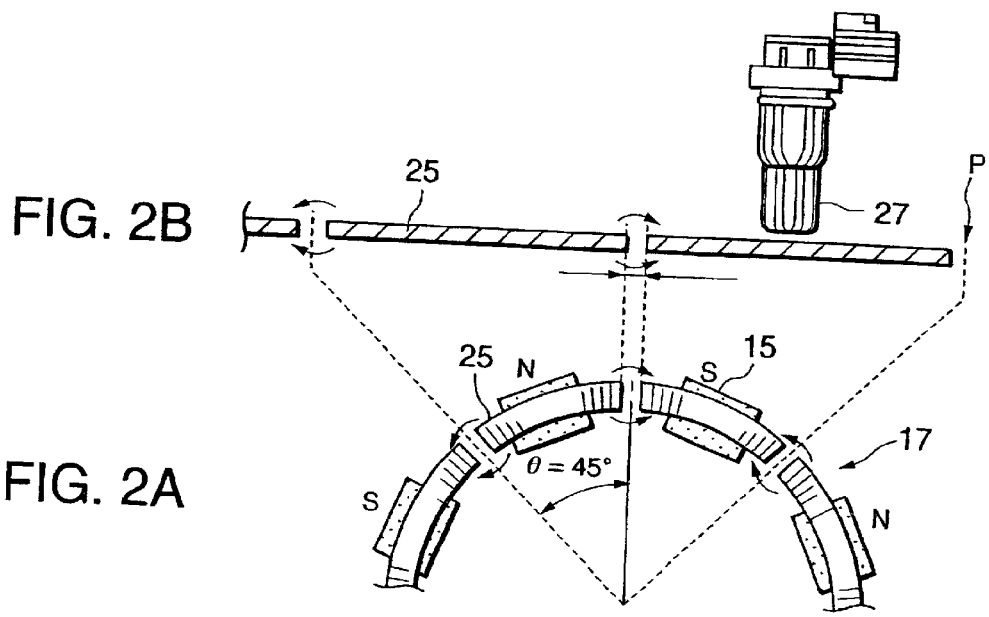
FIG. 2B
FIG. 2A

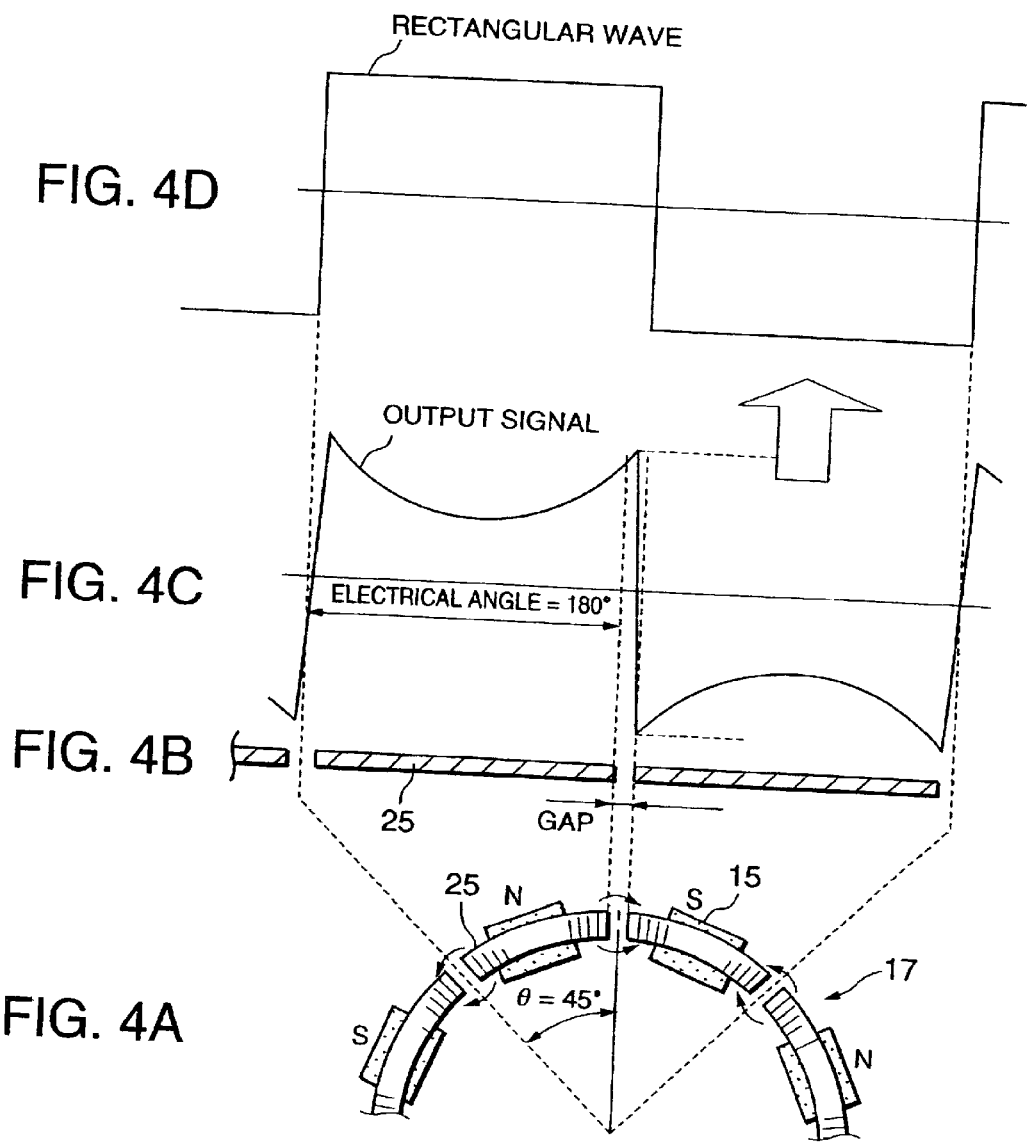

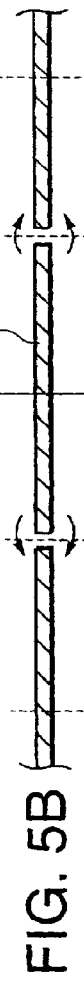
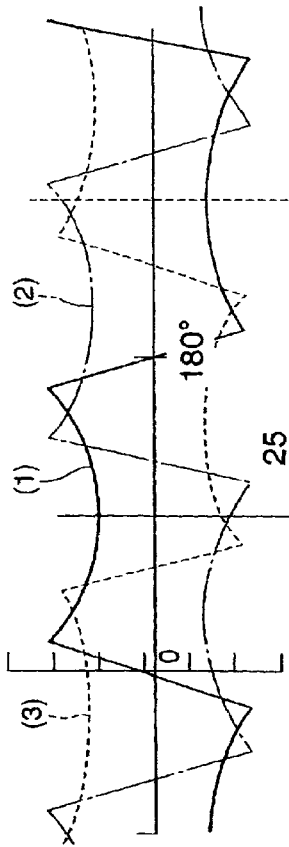
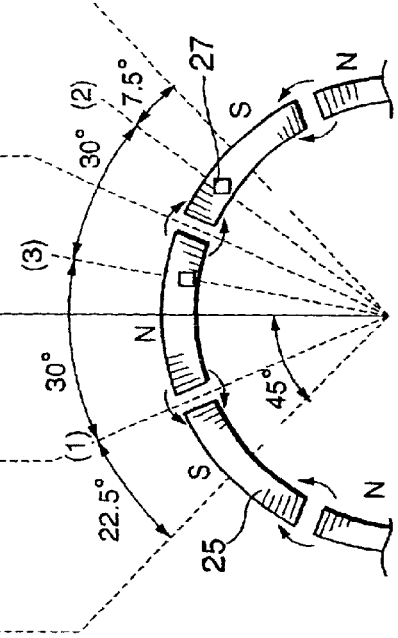
FIG. 5C
FIG. 5B
FIG. 5A

MAGNETIC POLE POSITION DETECTOR FOR ROTOR

FIELD OF THE INVENTION

This invention relates to detecting the position of a magnetic pole of a motor by use of a magnetic sensor.

BACKGROUND OF THE INVENTION

Tokkai Hei 11-215881 published by the Japanese Patent Office in 1999 discloses a magnetic pole position detector of a brushless DC motor.

The detector is provided with a disk which rotates together with a rotor of the motor. The rotor is provided with four magnets so as to form four magnetic poles. The outer periphery of the disk is also magnetized to have four magnetic poles. Three Hall integrated circuits facing the outer periphery of the disk detect variations in a magnetic flux resulting from the rotation of the disk and output a signal indicating the rotation position of magnetic poles.

SUMMARY OF THE INVENTION

However, providing an auxiliary disk for detecting the rotation position of magnetic poles increases the size of the motor. Further, in order to ensure the accuracy of detection, it is indispensable to precisely magnetize the outer periphery of the disk.

On the other hand, a device is known in the art which detects the magnetic flux of a magnet of the rotor directly using a Hall integrated circuit. The Hall integrated circuit is disposed adjacent to the rotor in an axial direction and outputs positive or negative signals in response to the leakage flux of the magnetic poles. Leakage flux is magnetic flux which is not directed towards the coils of the stator, that is to say, magnetic flux not applied to the rotation of the rotor.

Increases in the size of the motor are avoided since this device not does employ a disk. However, errors in detecting variations in magnetic flux are liable to result due to the fact that the output signal of the Hall integrated circuit varies regularly in a sinusoidal wave form and the slope of the curve in the switchover region where the output signal changes from a positive to a negative signal is gentle. Furthermore when an exciting current is supplied to the coils of the stator, the apparent rotation positions of the magnetic poles is shifted since the magnetic flux of the exciting current affects the performance of Hall integrated circuit.

It is therefore an object of this invention to detect the rotation positions of magnetic poles of a rotor correctly using a magnetic sensor such as Hall integrated circuit.

In order to achieve the above object, this invention provides a magnet pole position detector for such a rotor that has a plurality of magnets disposed on a circular periphery, and rotates with a rotation shaft. The detector comprises plates of the same number as the magnets and a magnetic sensor. The plates are made of a magnetic material. Each of the plates is disposed on the rotor at a position along a circular path nearby a corresponding magnet and magnetized by leakage flux of the corresponding magnet. The magnetic sensor outputs a signal in response to a variation of a magnetic flux density on the circular path.

The details as well as other features and advantages of this invention are set forth in the remainder of the specification and are shown in the accompanying drawings.

BRIEF DESCRIPTION OF THE DRAWINGS

FIG. 1 is a schematic diagram of a magnetic pole position detector of a rotor according to this invention.

FIG. 2A and FIG. 2B are a cross-sectional view of the rotor and a linearized cross-sectional view of plates made of magnetic materials according to this invention.

FIGS. 4A–4D are diagrams showing a rectangular wave signal with respect to positions of the plates, positions of the magnets, and an output signal of the magnetic sensor, according to this invention.

FIGS. 5A–5C are diagrams showing output signals of three magnetic sensors that are disposed to face the end face of the rotor, according to this invention.

DESCRIPTION OF THE PREFERRED EMBODIMENTS

Figure 3:
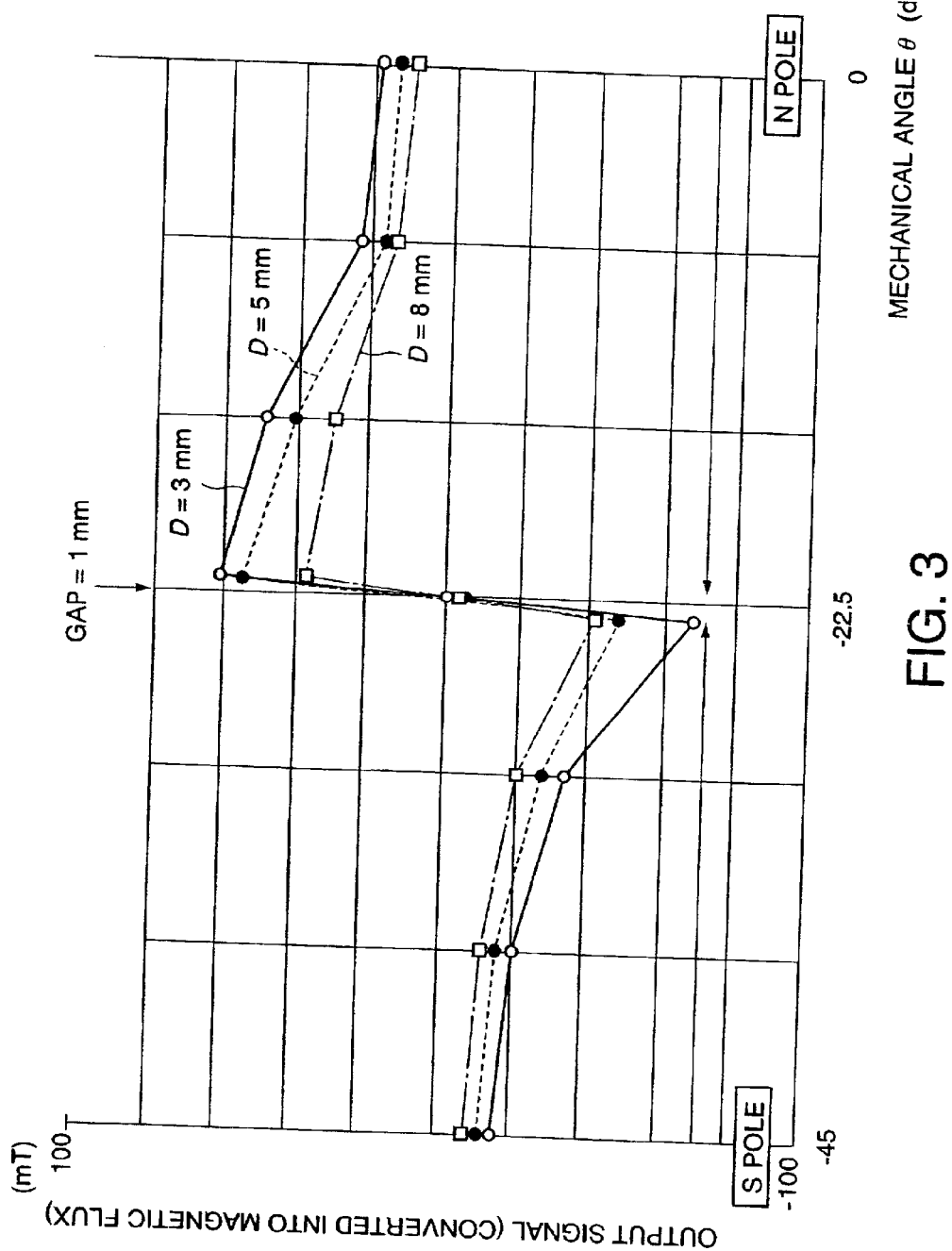
FIG. 3 is a diagram of an output signal of a magnetic sensor with respect to a distance from an end face of the rotor to the magnetic sensor, according to this invention.

Referring to FIG. 1 of the drawings, a synchronous motor 13 is provided with a rotor 17, a rotation shaft 21 of the rotor 17 and a stator 19 which has a plurality of coils 26 facing an outer periphery of the rotor 17.

Referring now to FIG. 2A, the rotor 17 is provided with magnets 15 which have four pairs of magnetic poles disposed alternatively at equal angular intervals. By providing polyphase alternating currents to the coils 26 to form rotating magnetic fields, the magnets 15 are invoked to follow the rotating magnetic fields and, as a result, the rotor 17 rotates in synchronism with the rotating magnetic fields.

The N poles and S poles of the magnets 15 shown in FIG. 2A express the polarity of the magnets 15 on the outer periphery of the rotor 17 facing the stator 19.

Referring again to FIG. 1, an end plate 23 of a non-magnetic body is fixed to an axial end of the rotor 17.

Plates 25 made of magnetic materials are recessed on the end plate 23 as shown in FIG. 2A at positions corresponding to the respective magnets 15. A predetermined space is provided between adjacent plates 25. The central axis of these spaces coincides with a straight line connecting the center of the rotor 17 and the middle point of two magnets 15. A non-magnetic body may be sandwiched between the plates 25 instead of the space. The plates 25 displace on a circular path on an axial end face of the rotor 17 together with the rotation of the rotor 17 as shown in FIG. 2A.

Magnetic sensors 27 are fixed at three positions on a case 13A of the motor 13 facing the circular path. Hall integrated circuits, MR circuit elements or GMR circuit elements may be used for example as the magnetic sensors 27. The output signal of the magnetic sensors 27 is output to a drive device (not shown) of the motor. The drive device detects a magnetic pole position on the basis of this signal and generates a polyphase alternating current corresponding to a torque applied to each magnet 15. This alternating current is supplied to the coils 26 of the stator 19.

FIG. 2B shows the plates 25 that are linearized for the explanatory reason.

Leakage flux of the magnet 15 magnetizes the plate 25 when close to the magnet 15. Since adjacent magnets 15 have different polarity, the interaction of adjacent plates 25 results in a magnetic flux being concentrated on the end of the plate 25.

The magnetic sensor 27 will be described below. When a current is applied to the magnetic sensor 27 through an idling resistor R (not shown) from a power source, a voltage signal is output from the magnetic sensor 27 in a direction orthogonal respectively to the direction of the magnetic flux and the direction of the current. FIG. 3 shows the relationship between the distance D from the axial end face of the rotor 17 to the magnetic sensor 27 and a signal output by the magnetic sensor 27 as measured in a synchronous motor comprising four pairs of magnetic poles as described above. In the figure, the voltage signal output by the magnetic sensor 27 is converted to a flux density and expressed in units of milletesla (mT). The figure shows variation in the output signal when the distance D from the axial end face of the rotor 17 to the magnetic sensor 27 is taken to be 3 mm, 5 mm and 8 mm respectively.

The voltage signal output by the magnetic sensor 27 has a value of 0 mT in the figure at the point P where the mechanical angle θ between the S pole and the N pole equals 22.5 degrees. The voltage signal displays sharp variation. on either side of the point P.

The output signal of the magnetic sensor 27 has a maximum positive value when facing the end of the plate 25 which corresponds to the N pole of the magnet 15. Conversely the output signal of the magnetic sensor 27 has a maximum negative value when facing the end of the plate 25 which corresponds to the S pole of the magnet 15.

That is to say, in FIG. 2A, the output signal of the magnetic sensor 27 undergoes sharp variation on the border with the point P. The output wave of a prior art magnetic sensor was sinusoidal. However the output of the magnetic sensor of the magnetic pole position detector according to this invention undergoes sharp variation when it passes the space between the plates 25. In other words, the output takes a maximum value near the border of the plates 25. The accuracy of detecting a pole position is therefore ensured even if there are fluctuations in the performance of the magnetic sensor 27 or deviations in the output voltage signal thereof.

Referring now to FIGS. 4A–4D, the output signal of the magnetic sensor 27 undergoes sharp variation at intervals of an electrical angle of 180 degrees as shown in FIG. 4C when passing the space between the plates 25. A rectangular wave signal is obtained as shown in FIG. 4D by comparing this signal in a comparator with a predetermined value. An electrical angle is an angle obtained when one variation cycle of the output signal of the magnetic sensor 27 is taken to have a value of 360 degrees. Since the rotor 17 has four pairs of magnetic poles, a single rotation of the rotor 17 corresponds to four cycles of the output signal of the magnetic sensor 27. Thus an electrical angle of 360 degrees corresponds to a mechanical angle of 90 degrees. Referring Referring now to FIGS. 5A–5C, it is possible to discriminate magnetic pole positions at intervals of an electrical angle of 60 degrees from the output signal of the three magnetic sensors 27 due to the disposition of magnetic sensors 27 at 30-degree intervals at the three positions (1), (2), (3) facing the circular path of the plates 25.

In this device also, the output signal of the magnetic sensor 27 is affected by the exciting current supplied to the coils 26 of the stator 19. However, the characteristic feature of the output signal of the magnetic sensor 27, i.e., a sharp variation about the border of the adjacent plates 25, does not change under the effect of the exciting current of the coils 26. Specifically, in this magnetic pole position detector the length of the plate 25 in the peripheral direction of the rotor 17 is set to be longer than that of the magnet 15. This setting plays an important role to produce a sharp variation of the output signal of the magnetic sensor 27 about the border of the adjacent plates 25. The accuracy of detecting magnetic pole positions is thus ensured under the effect of the exciting current of the coils 26.

Figure 6A:
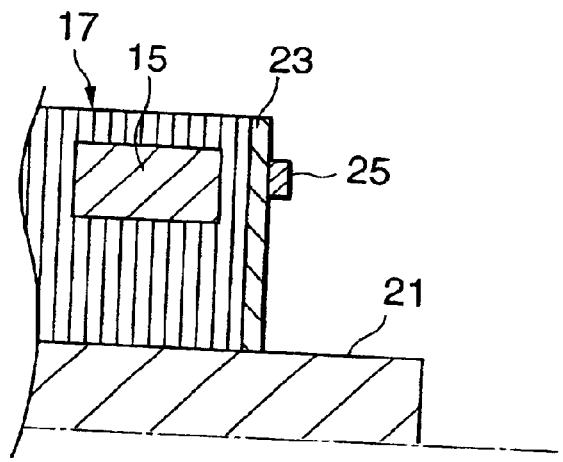
FIGS. 6A–6C are longitudinal cross-sectional views of the main components of the rotor showing variations in the disposition of the plates, according to this invention.
Figure 6B:
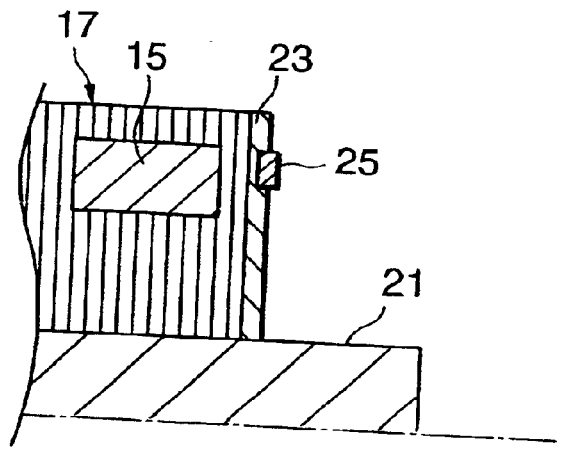
Figure 6C:
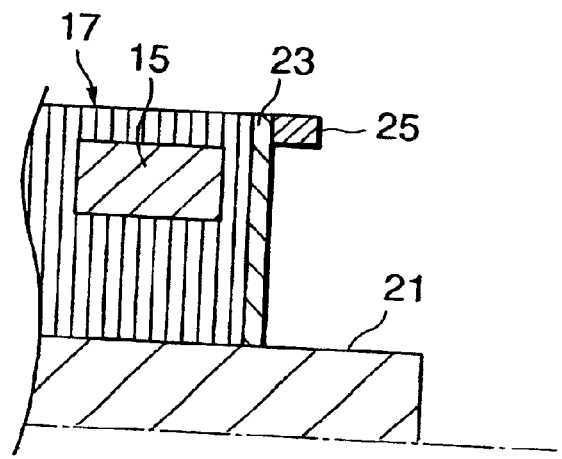

Referring now to FIGS. 6A–6C, possible variations in the disposition of the plates 25 will be described. In FIG. 1, each of the plates 25 is recessed on the end plate 23. However the plate 25 may be disposed in various ways in this invention. For example, as shown in FIG. 6A, the plate 25 may be fixed on the end plate 23. As shown in FIG. 6B, half of the plate 25 may be recessed in the end plate 23. Furthermore as shown in FIG. 6C, the plate 25 may be fixed to an outer edge of the end plate 23. If the plate 25 is lengthened in the direction of the rotation shaft 21 as shown in FIG. 6C, it is possible to dispose the magnetic sensor 27 on an outer side of the rotor 17.

As described above, according to the magnetic pole position detector of this invention, because a magnetic loop is concentrated on both ends of the plate 25, the phase shift of the output signal of the magnetic sensor 27 is not likely to occur, so the detection of the position of the magnetic poles of the rotor 17 is always performed with accuracy.

Figure 7:
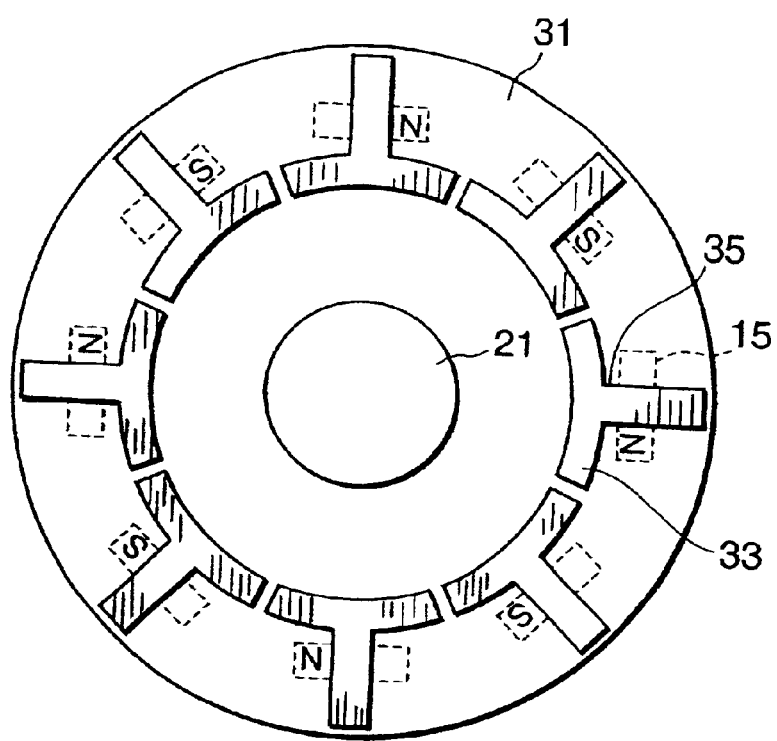
FIG. 7 is a cross-sectional view of the rotor according to a second embodiment of this invention.

A second embodiment of this invention will be described referring to FIG. 7.

This embodiment differs from the first embodiment only with respect to the structure of the rotor. The rotor 31 in this embodiment is provided with plates 33 made of magnetic materials on an inner periphery of the axial end face. The plate 33 is formed in the shape of a letter "T". The vertical section of the letter "T" reaches an outer periphery of the rotor in a radial direction.

This part functions as a magnetic passage 35 transmitting the magnetic flux of the magnet 15 to the plate 33. The horizontal section of the letter "T" is slightly arc-shaped. The distance between the horizontal section and the rotation shaft 21 is set shorter than the distance between the corresponding magnet 15 and the rotation shaft 21. The magnetic sensor is disposed to face a circular path on which the horizontal sections of the plates 33 travel.

Since this embodiment disposes the plates 33 at a position away from the stator, It is possible to reduce the effect of the exciting current in the stator coils on the output current of the magnetic sensor.

Figure 8:
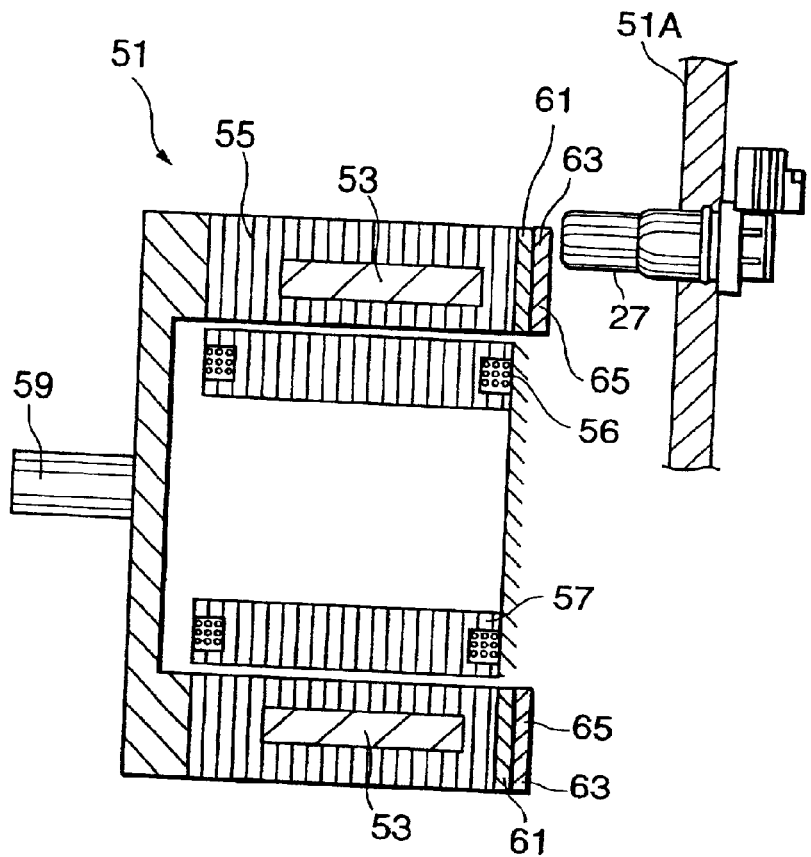
FIG. 8 is a schematic diagram of the magnetic pole position detector according to a third embodiment of this invention.
Figure 9:
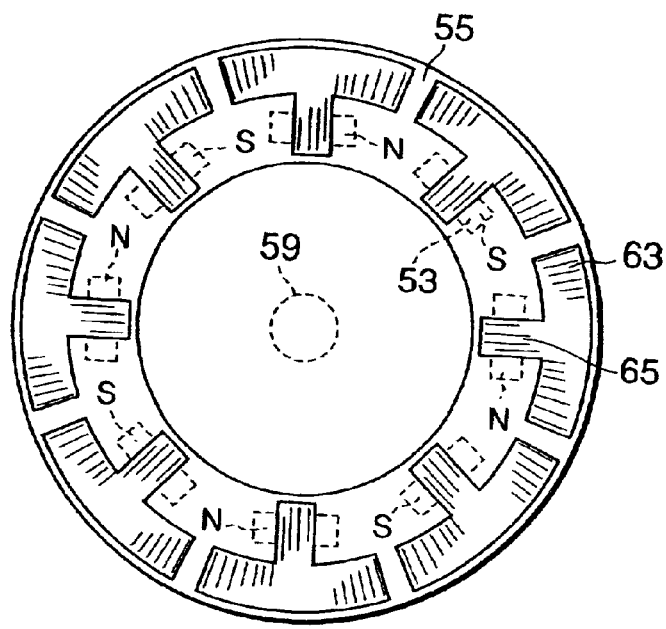
FIG. 9 is a cross-sectional view of an outer rotor according to the third embodiment of this invention.

Next, a magnetic pole position detector of the motor 51 according to a third embodiment of this invention will be described referring to FIGS. 8 and 9.

In this embodiment, the rotor 51 provided with an outer rotor 55 having magnets 53 and a rotation shaft 59, and a stator 57 provided with coils 56 and disposed on an inner side of the outer rotor 55.

An end plate 61 of a non-magnetic body is fixed to an axial end of the outer rotor 55. A plate 63 in the shape of a letter "T" is fixed to the end plate 61. The horizontal section of the plate 63 is disposed along the outer periphery of the outer rotor 55 as shown in FIG. 9. The vertical section of the plate 63 reaches an inner periphery of the outer rotor 55 along the end plate 61. The vertical section functions as a circuit 65 transmitting the magnetic flux of the magnet 53 to the horizontal section of the plate 63.

The magnetic sensor 27 is disposed to face an axial end face of the outer rotor 55 at a position proximate to the outer periphery of the outer rotor 55. A magnetic sensor 27 is fixed to the case 51A of the motor 51 facing the circular path of the horizontal part of the plates 63 as the outer rotor 55 rotates.

Since the horizontal part of the plates 63 in this embodiment is disposed along an outer periphery of the outer rotor 55 further from the stator 57 than the magnet 53, it is possible to dispose the magnetic sensor 27 at a position distant from the coils 56 of the stator 57, so the effect of the current flowing through the coils on the magnetic sensor 27 is kept small.

Figure 10A:
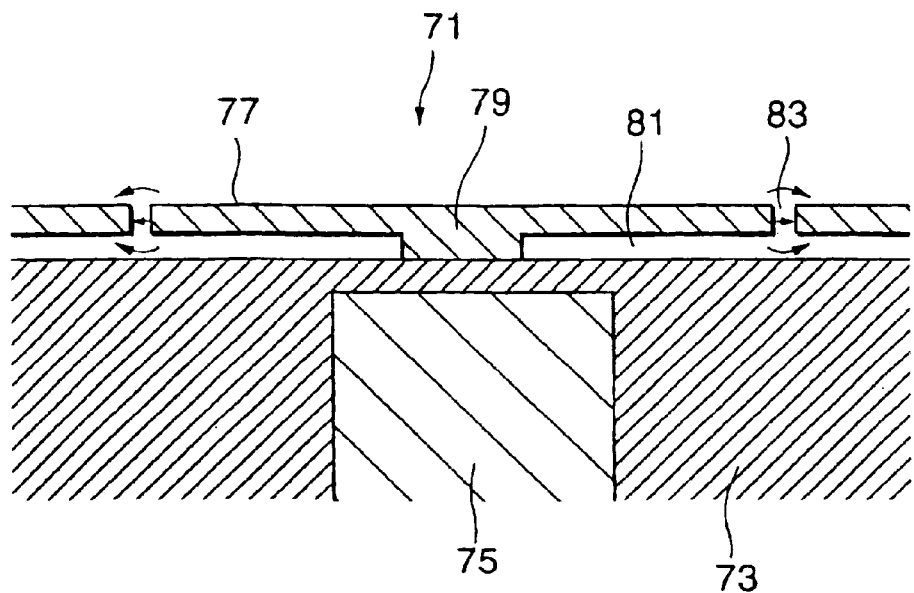
FIGS. 10A and 10B are enlarged longitudinal-sectional views of the main components of the rotor showing alternative constructions of the end face of the rotor, according to this invention.
Figure 10B:
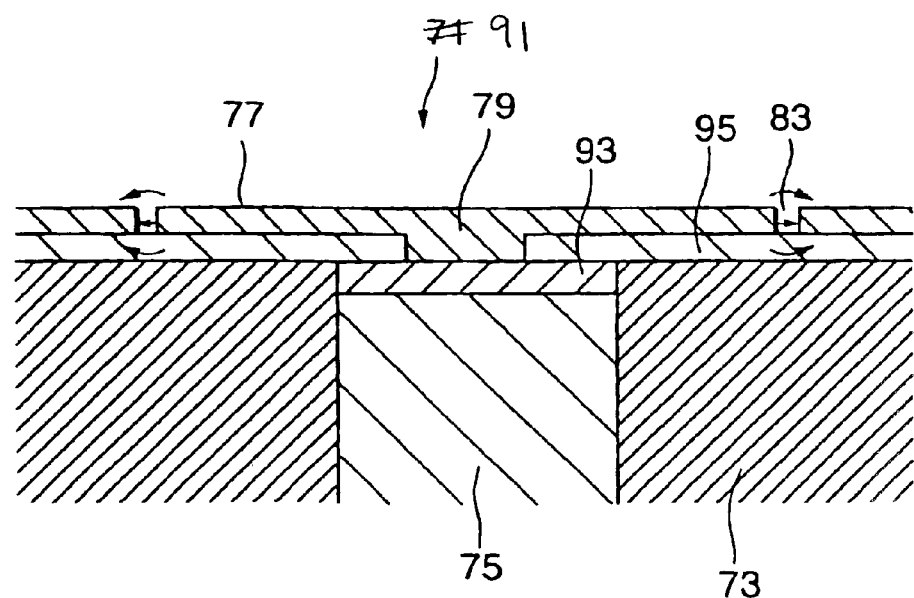

Referring now to FIGS. 10A and 10B, variations in the disposition of the plates with respect to the magnets will be described. These variations can be applied to any of the first to the third embodiments.

In FIG. 10A, a rotor 71 is provided with a laminated steel plates functioning as a rotor core 73. Magnets 75 are recessed in the core 73. Plates 77 made of magnetic materials are fixed to an axial end of the core 73. The plate 77 has a contacting part 79 that is fixed to the core 73 and functions as a magnetic passage that transmits the magnetic flux of the magnet 75 to the plate 77. Apart from the contacting part 79, a space 81 is formed between the plate 77 and the core 73. Another space 83 is formed between two adjacent plates 77.

In FIG. 10B, a rotor 91 is provided with a non-magnetic body 93 recessed in the core 73 between the contacting part 79 and the magnet 75. An end plate 95 made of non-magnetic materials is provided between the core 73 and the plate 77. In either of the structures shown in FIGS. 10A and 10B, the magnetic flux from the magnet 75 is introduced to the plate 77 by the contacting part 79, and the magnetic flux loop is concentrated on both ends of the plate 77 which faces the spaces 83.

Further variations in the disposition of the plates will be described referring to FIGS. 11A–11D.

These variations can be applied to any of the first to the third embodiments.

Figure 11A:
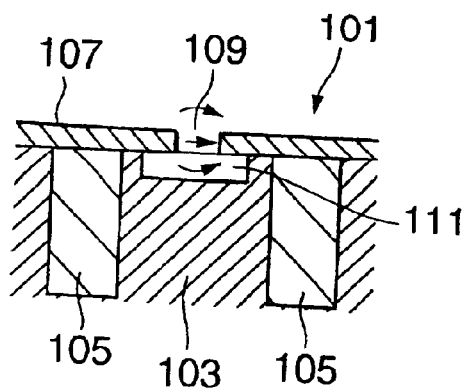
FIGS. 11A–11D are enlarged longitudinal-sectional views of the main components of the rotor showing alternative constructions of the rotor, according to this invention.

Firstly in FIG. 11A, a rotor 101 is provided with a 1 core 103 comprising laminated steel plates and with magnets 105 recessed in the core 103. Plates 107 made of magnetic materials are fixed to an axial end of the rotor 101 and respectively make contact with a corresponding magnet 105. Two adjacent plates 107 are separated by a space 109. A recess 111 is formed in the core 103 under the space 109. The recess 111 may be filled with a non-magnetic material. The width of the recess 111 is set to be wider than that of the space 109 while narrower than the distance between adjacent magnets 105.

Figure 11B:
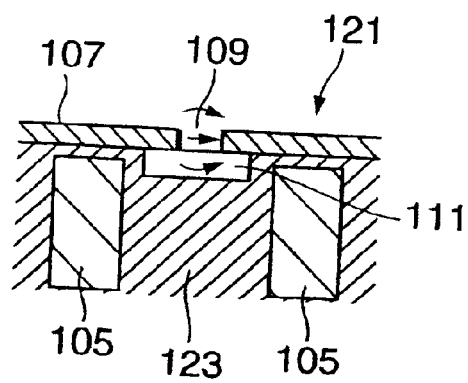

In FIG. 11B, a rotor 121 is provided with a core 123 comprising laminated steed plates and with the magnets 105 recessed in the core 123. The magnets 105 are covered by the core 123. Plates 107 made of magnetic materials are fixed to the core 123 on an axial end of the rotor 121. Two adjacent plates 107 are separated by the space 109 and the recess 111 is formed in the core 103 under the space 109 in the same way as in the rotor 101 of FIG. 11A.

Figure 11C:
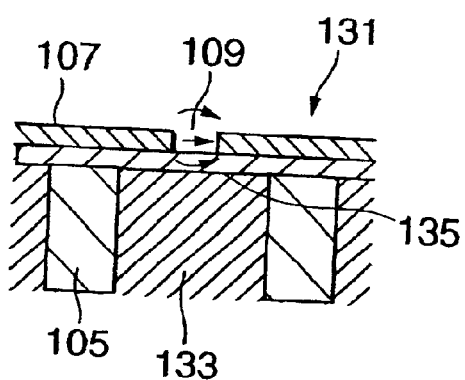

In FIG. 11C, a rotor 131 is provided with a core 133 comprising a laminated steel plates and with the magnets 105 recessed in the core 133. One axial end of the rotor 131 is covered by a non-magnetic plate 135. The plates 107 are disposed on one side of the non-magnetic plate 135 opposite to the magnets 105 so that the non-magnetic plate 135 is gripped between the plates 107 and the magnets 105. Two adjacent plates 107 are separated by the space 109.

Figure 11D:
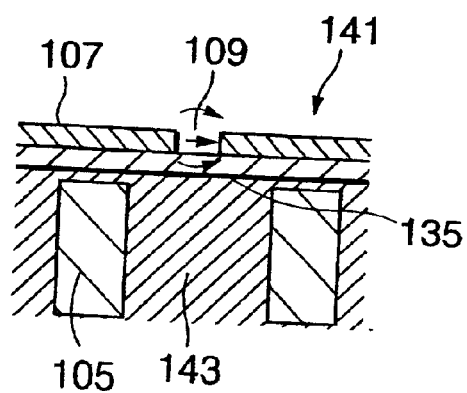

In FIG. 11D, a rotor 141 is provided with a core 143 comprising laminated steel plates and with magnets 105 recessed in the core 143. The magnets 105 are covered by the core. 143. One axial end of the rotor 141 is covered by the non-magnetic plate 135 in the same way as the structure of FIG. 11C. The plates 107 are disposed on one side of the non-magnetic plate 135 opposite to the magnets 105. Two adjacent plates 107 are separated by the space 109.

In any of the structures shown in FIGS. 11A–11D, the magnetic flux loop is concentrated on both ends of the plate 107 by forming the space 109 between adjacent plates 107 or by disposing a non-magnetic body therebetween.

Figure 12:
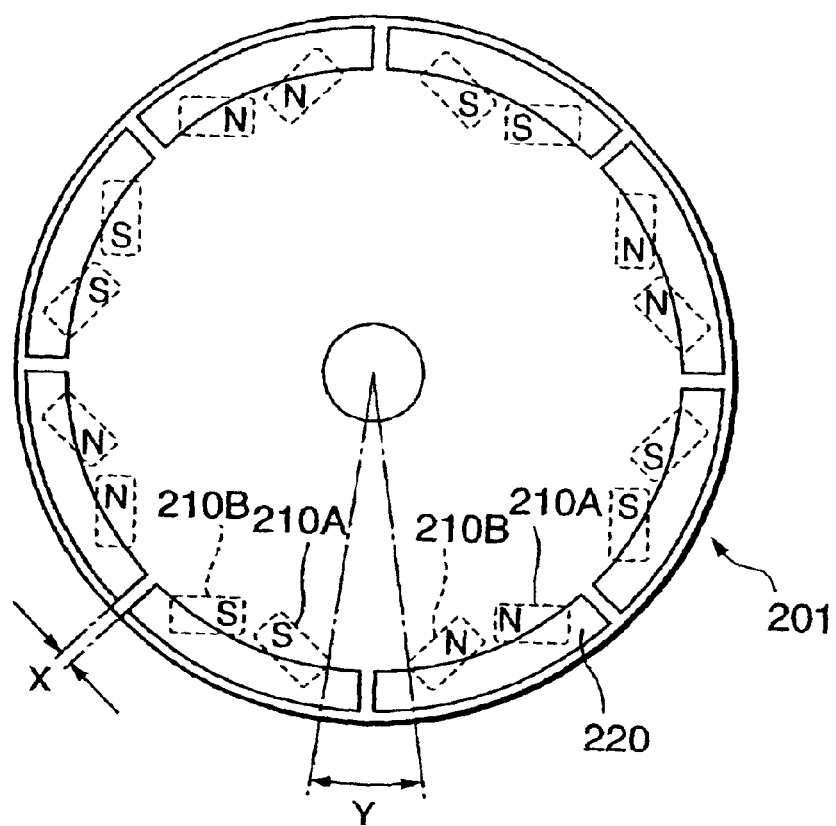
FIG. 12 is a cross-sectional view of the rotor according to a fourth embodiment of this invention.

A fourth embodiment of this invention will be described with reference to FIG. 12.

This embodiment differs from the other embodiments with respect to the disposition of the magnets on the rotor. Specifically in this embodiment, pairs of two magnet components 210A, 210B of equal polarity are disposed on a rotor 201. Each pair of the magnet components 210A, 210B function as one magnet and the pairs of the magnet components 210A, 210B are disposed at fixed intervals. Plates 220 made of magnetic materials are disposed at positions corresponding to the respective pairs of the magnet components 210A, 210B on an axial end face of the rotor 201.

In all the rotors described earlier, the polarity of adjacent magnets was different. However it is possible to adapt this invention to the rotor 201 in which pairs of two magnet components 210A, 210B of equal polarity are provided to form a single magnetic pole.

According to this embodiment, the output signal of the magnetic sensor sharply varies when it passes a space between the plates 220 by setting the width X of the space between the plates 220 to be smaller than the width Y of the space between the pairs of magnet components 210A, 210B having different polarity.

Figure 13:
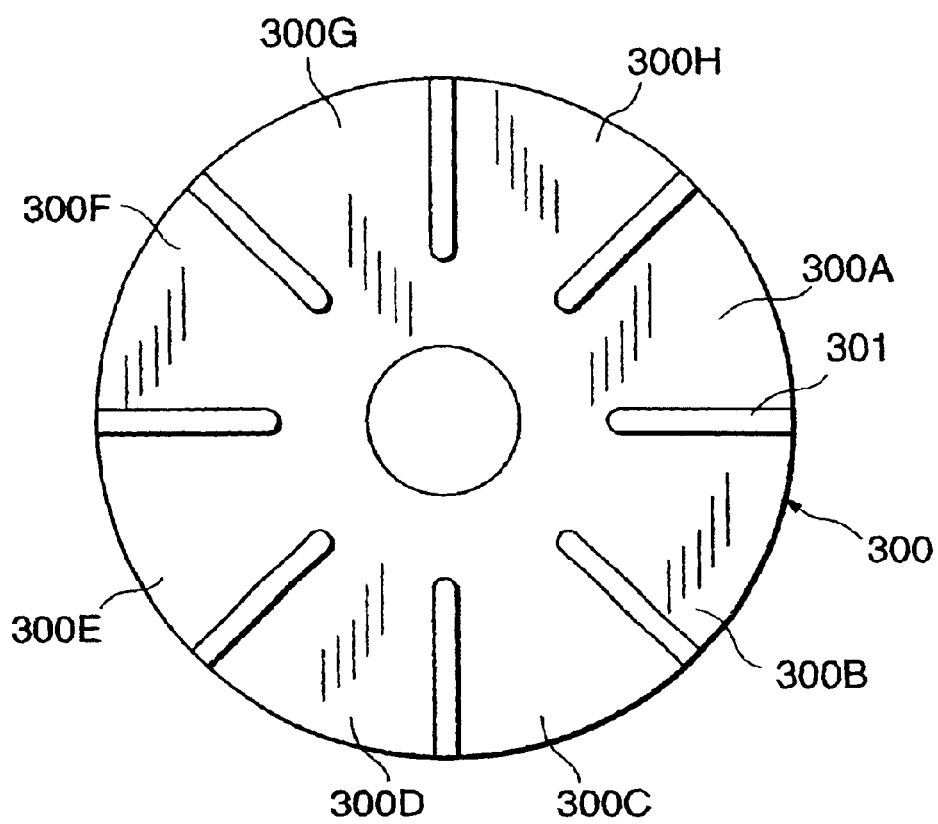
FIG. 13 is a front view of a disk according to a fifth embodiment of this invention.

A fifth embodiment of this invention will be described with reference to FIG. 13.

This embodiment relates to the shape of the plates made of magnetic materials.

The plates 25, 33, 63, 77, 107 and 220 used in the first to fourth embodiments are independent and are not in contact with each other. However in this embodiment, a disk 300 made of magnetic materials is divided into plate members 300A–300H by forming radial grooves on the disk 300. The plate members 300A–300H correspond to the single plates 25, 33, 63, 77, 107 and 220 in the first to fourth embodiments.

In this disk 300, the plate members 300A–300H are in electrical contact with each other at a central section of the disk 300. However the plate members 300A–300H still concentrate the magnetic flux on both sides of the grooves 301. This is achieved by disposing the magnets of the rotor such that each of the grooves corresponds to the central point of the space between two adjacent magnets. With such an arrangement, the single disk 300 may replace the plates 25, 33, 63, 77, 107 and 220 of the first—fourth embodiments.

Figure 14:
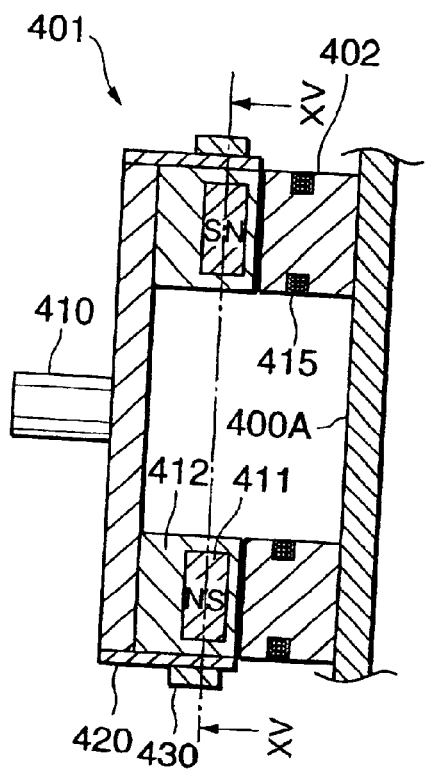
FIG. 14 is a longitudinal-sectional view of the rotor and a stator according to a sixth embodiment of this invention.
Figure 15:
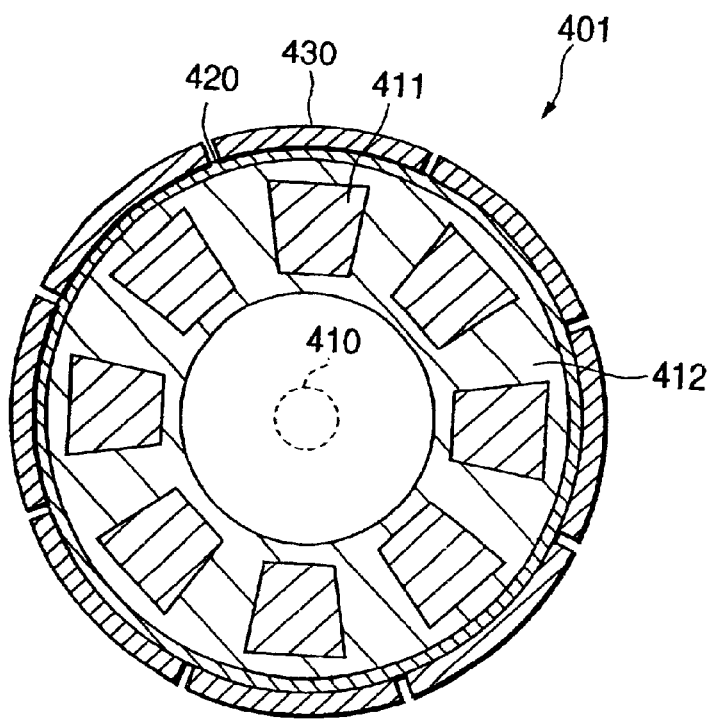
FIG. 15 is a cross-sectional view of the rotor taken along the line XV—XV in FIG. 14.

A sixth embodiment of this invention will be described with reference to FIG. 14 and FIG. 15.

A motor according to this embodiment is provided with a cylindrical rotor 401 and a stator 402 facing the rotor 401 from an axial direction. The stator 402 is fixed to the case 400A of the motor. The rotor 401 is provided with a cylindrical core 412, magnets 411 recessed at equal angular intervals in the core 412 as shown in FIG. 15 and a rotation shaft 410 extending in an opposite direction to the stator 402. The stator 402 is provided with coils 415 of the equal number to that of the magnets 411.

The polarity of the magnets 411 facing the stator 402 alternates one by one in the peripheral direction of the rotor 401.

A collar 420 made of non-magnetic materials is fitted on an outer periphery of the rotor 401. Plates 430 made of magnetic materials are fixed at equal angular intervals to the outer periphery of the end plate 420. The width of the space between adjacent plates 430 is set to be smaller than that of the space between adjacent magnets 411. A magnetic sensor (not shown) is provided on a position facing the outer periphery of the rotor 401. In this manner, this invention may be applied to a motor which aligns a rotor and a stator in an axial direction.

The contents of Tokugan (Patent Application No.) 2000-33500 with a filing date of Feb. 10, 2000 in Japan, and Tokugan (Patent Application No.) 2001-11876 with a filing date of Jan. 19, 2001 in Japan are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A magnet pole position detector for a rotor that has a plurality of magnets disposed on a circular periphery, and rotates with a rotation shaft, the detector comprising:
plates of the same number as the magnets, the plates being made of a magnetic material, each of the plates being disposed on the rotor at a position along a circular path nearby a corresponding magnet and magnetized by leakage flux of the corresponding magnet, wherein the plates are fixed to an end face of the rotor, the end face facing in a direction along the rotation shaft; and
a magnetic sensor outputting a signal in response to a variation of a magnetic flux density on the circular path.

2. The magnet pole position detector as defined in claim 1, wherein the plates form a maximum flux density on both ends of the plates on the circular path.

3. The magnet pole position detector as defined in claim 1, wherein an interval between adjacent plates is set to be narrower than an interval between adjacent magnets.

4. The magnet pole position detector as defined in claim 1, wherein the rotor forms a part of an electric motor that has a stator provided with a plurality of coils, and wherein the rotor is disposed on an inner side of the stator.

5. The magnet pole position detector as defined in claim 1, wherein the rotor forms a part of an electric motor that has a stator provided with a plurality of coils and wherein the rotor is disposed on an outer side of the stator.

6. The magnet pole position detector as defined in claim 1, wherein each of the plates comprises a magnetic passage transmitting magnetic flux of the corresponding magnet to the plates.

7. The magnet pole position detector as defined in claim 1, wherein the rotor further comprises a rotor core retaining the magnets, and the plates are fixed to the rotor core.

8. The magnet pole position detector as defined in claim 1, wherein each of the magnets comprises a pair of magnet components that have equal polarity.

9. The magnet pole position detector as in claim 1, wherein the magnetic sensor comprises three sensors that are positioned at approximately 30-degree intervals.

10. A magnet pole position detector for a rotor that has a plurality of magnets disposed on a circular periphery, and rotates with a rotation shaft, the detector comprising:
plates of the same number as the magnets, the plates being made of a magnetic material, each of the plates being disposed on the rotor at a position along a circular path nearby a corresponding magnet and magnetized by leakage flux of the corresponding magnet, wherein the rotor comprises a rotor core retaining the magnets, and wherein the plates are fixed to the rotor core via an end plate made of a non-magnetic material; and
a magnetic sensor outputting a signal in response to a variation of a magnetic flux density on the circular path.

11. A magnet pole position detector for a rotor that has a plurality of magnets disposed on a circular periphery, and rotates with a rotation shaft, the detector comprising:
plates of the same number as the magnets, the plates being made of a magnetic material, each of the plates being disposed on the rotor at a position along a circular path nearby a corresponding magnet and magnetized by leakage flux of the corresponding magnet, wherein the plates are provided in the form of a disk in which adjacent plates are separated by a radial groove formed on the disk; and
a magnetic sensor outputting a signal in response to a variation of a magnetic flux density on the circular path.

12. A magnet pole position detector for a rotor that has a plurality of rotating magnets disposed on a circular periphery, the detector comprising:
plates of the same number as the magnets, the plates being made of a magnetic material, each of the plates being disposed on the rotor at a position along a circular path nearby a corresponding magnet and magnetized by leakage flux on the corresponding magnet; and
a magnetic sensor adapted to output a signal in response to a variation of a magnetic flux density on the circular path;
wherein the plates are provided in the form of a disk in which adjacent plates are separated by at least one radial groove formed on the disk, and wherein the magnetic flux is concentrated on both sides of at least one of the at least one radial groove.

13. A magnetic pole position detector for a rotor that has a plurality of rotating magnets disposed on a circular periphery, the detector comprising:
plates of the same number as the magnets, the plates being made of a magnetic material, each of the plates being disposed on the rotor at a position along a circular path nearby a corresponding magnet and magnetized by leakage flux on the corresponding magnet; and
a magnetic sensor adapted to output a signal in response to a variation of a magnetic flux density on the circular path;

wherein the detector is configured such that the output signal undergoes a sharp variation as the plates rotate and that the output signal has a maximum positive value when facing the end of a plate corresponding to the north pole of a magnet.

14. The detector of claim 13, wherein the detector is configured such that the output signal has a maximum negative value when facing the end of a plate corresponding to the south pole of a magnet.

15. The detector of claim 14, wherein the detector is configured such that a maximum positive value and a maximum negative value is obtained within about 4° or less of magnet rotation.

16. The detector of claim 14, wherein the detector is configured such that a maximum positive value and a maximum negative value is obtained within about 2° or less of magnet rotation.

17. A magnet pole position detector for a rotor that has a plurality of magnets disposed on a circular periphery, rotates with a rotation shaft, and forms a part of an electric motor that has a stator provided with a plurality of coils, the detector comprising:

plates of the same number as the magnets, the plates being made of a magnetic material, each of the plates being fixed on an outer periphery of the rotor via a non-magnetic material at a position along a circular path nearby a corresponding magnet and magnetized by leakage flux of the corresponding magnet; and a magnetic sensor outputting a signal in response to a variation of a magnetic flux density on the circular path.

18. The magnet pole position detector as defined in claim 17, wherein the non-magnetic material is arranged on an outer periphery of the rotor.

19. The detector of claim 17, wherein the magnets are configured such that the magnetic flux is concentrated on the ends of the plates.

20. The detector of claim 17, wherein the magnets are positioned with alternating polarity such that the magnetic flux is concentrated on the ends of the plates.

21. The detector of claim 20, wherein the alternating polarity of the magnets is expressed on the circular periphery.

22. The detector of claim 17, wherein the magnets are positioned in magnet pairs, the pairs having equal polarity such that the magnetic flux is concentrated on the ends of the plates.

23. The detector of claim 22, wherein the magnet pairs are positioned to form a single magnetic pole.

24. The detector of claim 17, wherein the plates are provided in the form of a disk in which adjacent plates are separated by at least one radial groove formed on the disk, and wherein the magnetic flux is concentrated on both sides of at least one of the at least one radial groove.

25. The detector of claim 17, wherein the detector is configured such the output signal undergoes a sharp variation as the plates rotate.

26. The detector of claim 25, wherein the detector is configured such that the sharp variation comprises a variation from a positive value to a negative value.

27. The detector of claim 25, wherein the detector is configured such that the output signal has a maximum positive value when facing the end of a plate corresponding to the north pole of a magnet.

28. The detector of claim 27, wherein the detector is configured such that the output signal has a maximum negative value when facing the end of a plate corresponding to the south pole of a magnet.

29. The detector of claim 28, wherein the detector is configured such that a maximum positive value and a maximum negative value is obtained within about 4° or less of magnet rotation.

30. The detector of claim 28, wherein the detector is configured such that a maximum positive value and a maximum negative value is obtained within about 2° or less of magnet rotation.

* * * * *